US009449352B2

(12) United States Patent
Tang et al.

(10) Patent No.: US 9,449,352 B2
(45) Date of Patent: Sep. 20, 2016

(54) LOAD CONTROL SYSTEM AND LOAD CONTROL METHOD

(75) Inventors: Wen-Shiang Tang, Kaohsiung (TW); Ping-Hai Hsu, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 1020 days.

(21) Appl. No.: 13/562,107

(22) Filed: Jul. 30, 2012

(65) Prior Publication Data

US 2013/0162041 A1 Jun. 27, 2013

(30) Foreign Application Priority Data

Dec. 23, 2011 (TW) ............................ 100148216 A

(51) Int. Cl.
*H02J 3/14* (2006.01)
*G06Q 50/06* (2012.01)

(52) U.S. Cl.
CPC ............ *G06Q 50/06* (2013.01); *Y10T 307/469* (2015.04)

(58) Field of Classification Search
USPC ............................................ 307/39; 324/140
See application file for complete search history.

(56) References Cited

U.S. PATENT DOCUMENTS 7,702,424 B2 4/2010 Cannon et al.
7,772,718 B2 * 8/2010 Lee .................... H01R 13/7038 307/41
2006/0206246 A1 9/2006 Walker
2008/0080457 A1 * 4/2008 Cole .................. H04L 12/5692 370/342
2011/0025519 A1 * 2/2011 Donaldson ............ H04L 67/125 340/664
2011/0125337 A1 5/2011 Zavadsky
2011/0196547 A1 8/2011 Park
2012/0004871 A1 * 1/2012 Tsao .................. G01R 19/2513 702/61

FOREIGN PATENT DOCUMENTS

CN 1469549 A 1/2004
TW 501325 9/2002
TW 557426 10/2003
TW 200417265 9/2004
TW 200501500 1/2005

(Continued)

OTHER PUBLICATIONS

CN Office Action dated Aug. 5, 2015 from corresponding CN Appl No. 201110449585.1, 6 pp.

(Continued)

*Primary Examiner* — Rexford Barnie
*Assistant Examiner* — Xuan Ly
(74) *Attorney, Agent, or Firm* — Muncy, Geissler, Olds & Lowe, P.C.

(57) ABSTRACT

An exemplary embodiment provides a load management system, including a detecting module and a determining module. The detecting module creates at least one activated one of a plurality of loads located in a predetermined space as an activation set, and creates a group set including a plurality of sub-groups according to locations and activation times of the activated ones of the plurality of loads. The detecting module creates the activated ones of the plurality of loads which have been activated within a predetermined time period as one of the sub-groups. The determining module determines whether each of the activated ones of the plurality of loads is an essential load or a non-essential load according to the group set and the activation set to produce a determining result.

16 Claims, 9 Drawing Sheets

(56) References Cited

FOREIGN PATENT DOCUMENTS

| | | | |
|---|---|---|---|
| TW | I236853 | | 7/2005 |
| TW | 200533405 | | 10/2005 |
| TW | I244234 | | 11/2005 |
| TW | 200745996 | | 12/2007 |
| TW | 200830908 | | 7/2008 |
| TW | 200849936 | | 12/2008 |
| TW | 200906023 | | 2/2009 |
| TW | 200937182 | | 9/2009 |
| TW | M395316 | | 12/2010 |
| TW | 201101824 | A1 | 1/2011 |

OTHER PUBLICATIONS

Taiwan Office Action for Taiwan Application No. 100148216 dated Jan. 22, 2014.

Kato et al., "Appliance Recognition from Electric Current Signals for Information-Energy Integrated Network in Home Environments," International Conference on Smart Homes and Health Telematics—ICOST, 2009, pp. 150-157.

Lee et al., "Appliance Recognition and Unattended Appliance Detection for Energy Conservation," 2010 AAAI Workshop on Plan, Activity, and Intent Recognition (PAIR), Jul. 2010, pp. 1-8.

Harris et al., "Exploiting User Behaviour for Context-Aware Power Management," IEEE International Conference on Wireless and Mobile Computing, Networking and Communications—WiMob, 2005, pp. 1-9.

Chao et al., "A Profile based Energy Management System for Domestic Electrical Appliances," IEEE International Conference on e-Business Engineering—ICEBE , 2010, pp. 415-420.

Lien et al., "Power Monitoring and Control for Electric Home Appliances Based on Power Line Communication," IEEE International Instrumentation and Measurement Technology Conference, May 12-15, 2008, pp. 2179-2184.

Tompros et al., "Enabling Applicability of Energy Savings Applications on the Appliances of the Home Environment," IEEE Network, Nov./Dec. 2009, pp. 8-16.

* cited by examiner

LOAD CONTROL SYSTEM AND LOAD CONTROL METHOD

CROSS REFERENCE TO RELATED APPLICATIONS

This Application claims priority of Taiwan Patent Application No. 100148216, filed on Dec. 23, 2011, the disclosure of which is hereby incorporated by reference herein in its entirely.

BACKGROUND

1. Field

The exemplary embodiments relate to a load management system, and in particular relates to a load management system for automatically managing loads of household appliances.

2. Description of the Related Art

In recent years, most families purchased household appliances which are used daily, such as refrigerators and rice cookers. However, due to bad habits or negligence of users, these appliances continue working despite the fact that they are not necessarily used. Therefore, unnecessary power consumption is produced. In addition, some high-power electrical appliances, such as microwave ovens, cookers or a hair dryers, have tremendous power consumption instantly. When users use those kinds of appliances, it will likely increase risks for danger by suddenly shutting down or causing electrical fires when overloaded.

As a known technique, alarm devices have been developed to inform users of household appliances which have malfunctioned. However, this method is complex for users and thus, inconvenient. Therefore, there is a need for a method or device which can monitor various kinds of household appliances.

BRIEF SUMMARY

A detailed description is given in the following embodiments with reference to the accompanying drawings.

An exemplary embodiment provides a load management system including a detecting module and a determining module. The detecting module creates activated one of a plurality of loads located in a predetermined space as an activation set, and creates an associated group set comprising a plurality of associated sub-groups according to locations and activation times of activated ones of the plurality of loads, wherein the detecting module creates the activated ones of the plurality of loads which have been activated within a predetermined time period as one of the associated sub-groups. The determining module determines whether each of the activated ones of the plurality of loads is an essential load or a non-essential load according to the associated group set and the activation set to produce a determining result.

Another exemplary embodiment provides a load management method which is applied in a load management system, wherein the load management system includes a plurality of loads and an associated group set having a plurality of associated sub-groups. The load management method includes detecting whether a number of activated ones of the plurality of the loads has changed; creating the activated loads located in a predetermined space as an activation set when the number of the activated loads in the predetermined space has changed; determining whether the load management system is in an aggressive mode or a comfortable mode; determining whether each of the associated sub-groups is an incomplete activation group sequentially according to whether the associated sub-group is partially included in the activation set, when the load management system is in the aggressive mode; tagging each of the loads in a first associated sub-group of the associated sub-groups as a non-essential load, when the first associated sub-group is the incomplete activation group; producing a determining result according to the non-essential loads; and sending the determining result to a control device to turn off the non-essential loads.

Additionally, another exemplary embodiment provides another load management method which is also applied to the load management system, wherein the load management system includes a plurality of loads. The load management method includes detecting whether a number of the activated ones of the plurality of the loads has increased; determining whether the activated loads have been activated within a predetermined time period and whether the activated loads are located in a predetermined space, when the number of the activated loads increases; and creating the activated loads which have been activated within a predetermined time period and located in the predetermined space as an associated sub-group.

Furthermore, another exemplary embodiment provides another load management method which is also applied to the load management system, wherein the load management system comprises a plurality of loads and an associated group set including a plurality of associated sub-groups. The load management method includes detecting whether a number of the activated ones of the plurality of the loads has increased; determining whether the activated load is activated in a predetermined time period since an activation time of a most recently activated load included in a most recently created associated sub-group of the associated sub-groups and whether the activated load is located in a predetermined space with the most recently activated load included in the most recently created associated sub-group; and adding the activated load in the most recently created associated sub-group when the activated load is activated in the predetermined time period since the activation time of the most recently activated load and located in the predetermined space.

BRIEF DESCRIPTION OF THE DRAWINGS

The exemplary embodiments can be more fully understood by reading the subsequent detailed description and examples with references made to the accompanying drawings, wherein.

DETAILED DESCRIPTION

The following description is of the best-contemplated mode of carrying out the exemplary embodiments. This description is made for the purpose of illustrating the general principles of the exemplary embodiments and should not be taken in a limiting sense. The scope of the exemplary embodiments is best determined by reference to the appended claims.

Figure 1:
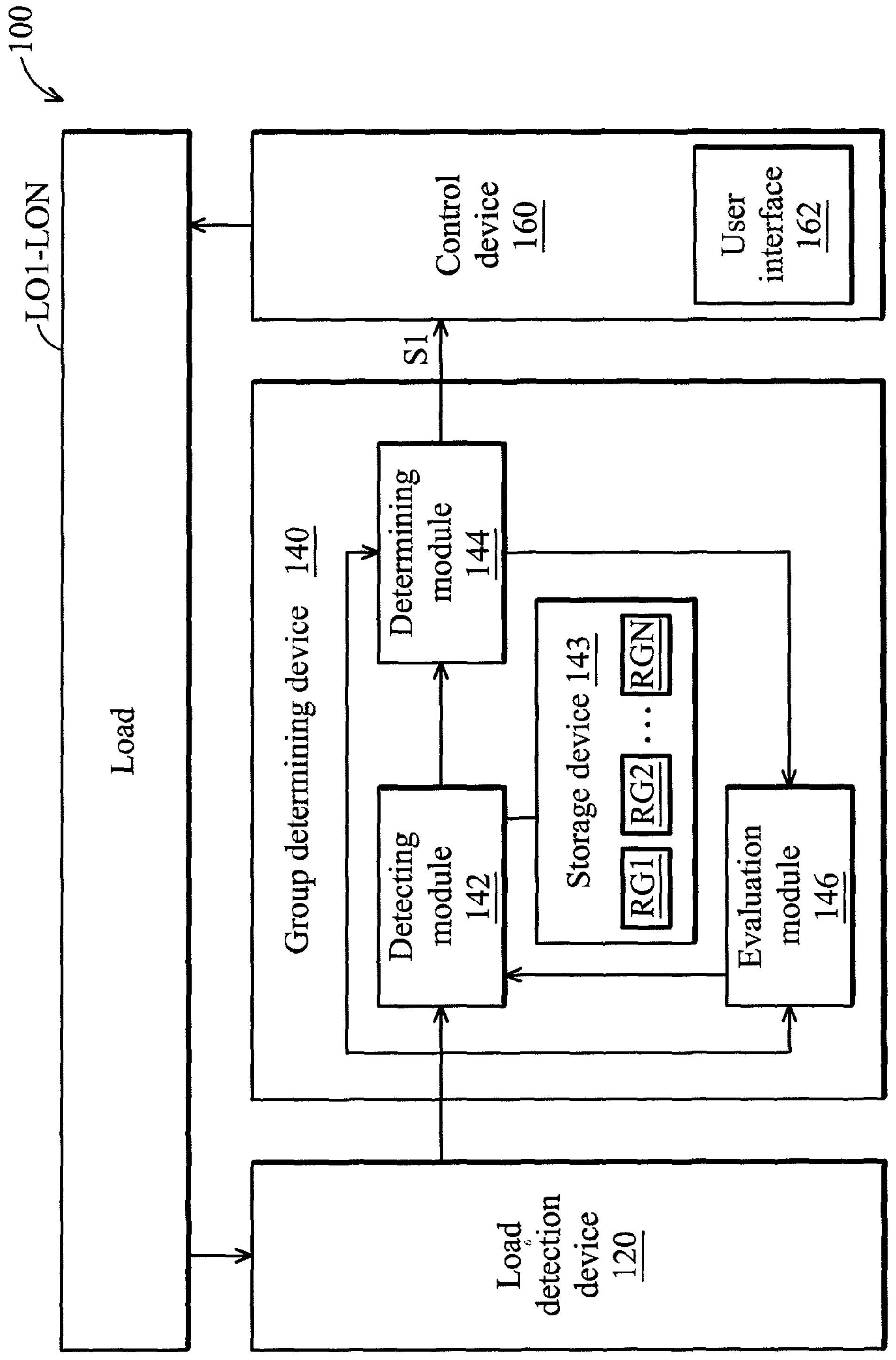
FIG. 1 is a schematic diagram illustrating a load management system according to an exemplary embodiment.
Figure 2:
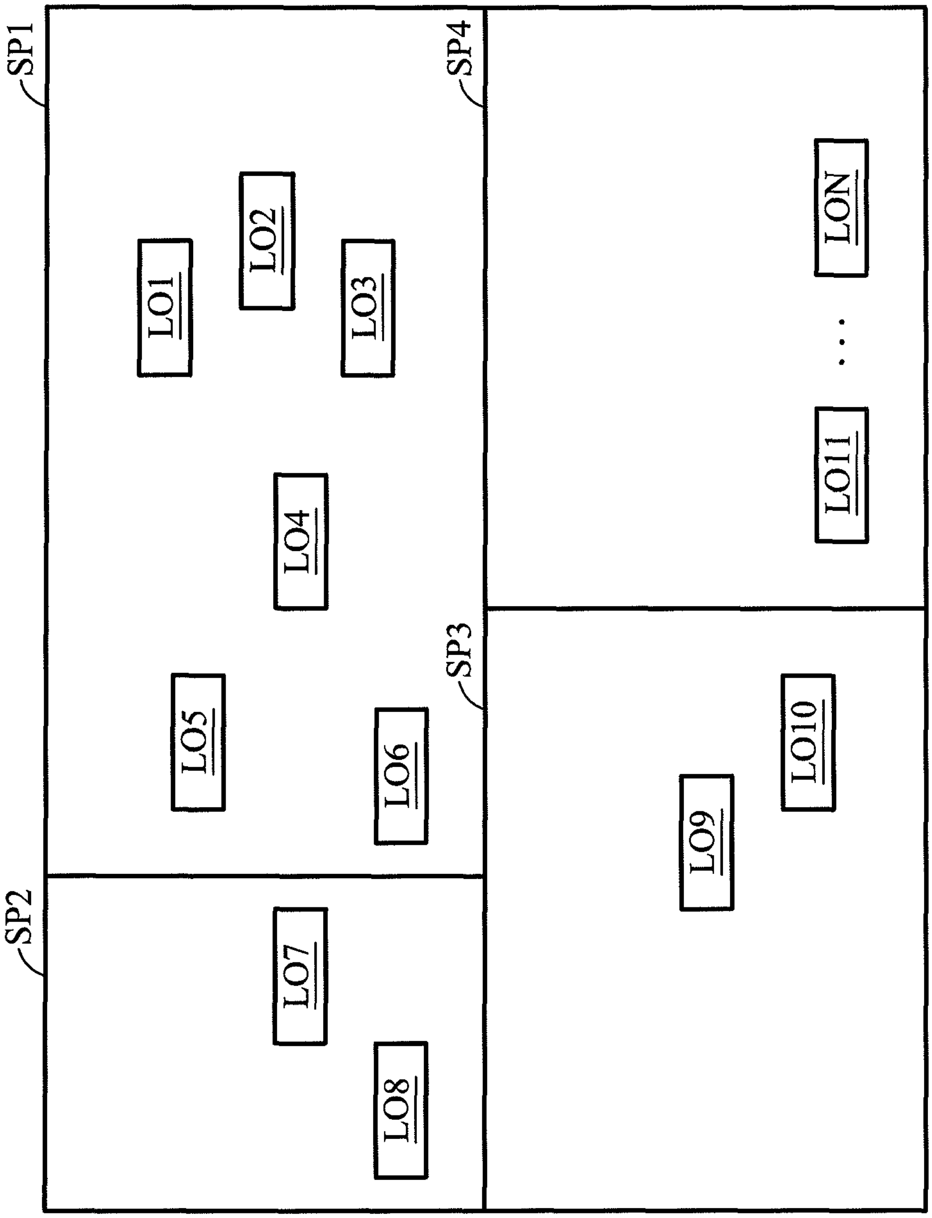
FIG. 2 is a schematic diagram illustrating a predetermined space according to an exemplary embodiment.

FIG. 1 is a schematic diagram illustrating a load management system according to an exemplary embodiment. The load management system 100 includes a plurality of loads LO1-LON, a load detection device 120, a group determining device 140, and a control device 160. For example, the loads LO1-LON can be disposed in one or more than one predetermined spaces. As shown in FIG. 2, predetermined spaces SP1-SP4 can be different rooms or different areas with different predetermined distances, and the loads LO1-LON can be electronic devices and/or home appliances which are disposed in the different predetermined spaces SP1-SP4. It should be noted that, the type and the number of the predetermined spaces and the loads LO1-LON are not limited thereto. As shown in FIG. 2, the loads LO1-LO6 are disposed/located in the predetermined space SP1, the loads LO7-LO8 are disposed in the predetermined space SP2, the loads LO9-LO10 are disposed in the predetermined space SP3, and the loads LO11-LON are disposed in the predetermined space SP4.

The load detection device 120 is coupled to the loads LO1-LON respectively to detect the locations of the loads LO1-LON and whether the loads LO1-LON have been activated, and sends the locations of the loads LO1-LON and the status of whether the loads LO1-LON have been activated to the detecting module 142. It should be noted that each of the loads LO1-LON has a corresponding identification code for being detected by the load detection device 120. The load detection device 120 detects the locations of the loads LO1-LON and whether the loads LO1-LON have been activated or inactivated according to the identification codes corresponding to the loads LO1-LON in an intrusive or a nonintrusive way. For example, the load detection device 120 can detect the loads LO1-LON which are inserted at a plurality of electric sockets on walls in a predetermined space (such as, predetermined space SP1-SP4) by the identifications of the electric sockets. In the other embodiment, the load detection device 120 can detect the loads LO1-LON by reading the value of the ammeters corresponding to the loads LO1-LON respectively.

Figure 3:
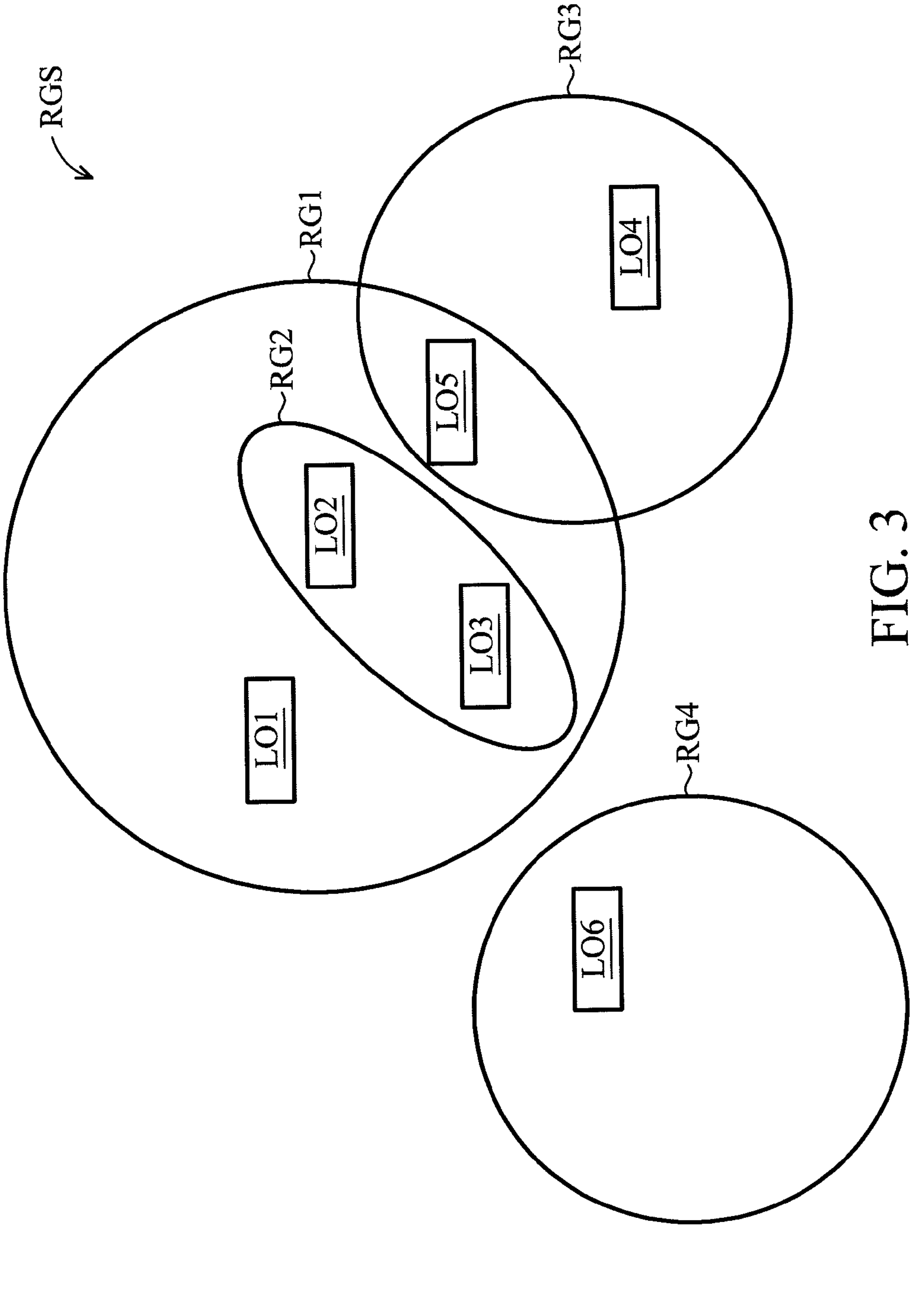
FIG. 3 is a schematic diagram illustrating a plurality of associated sub-groups according to an exemplary embodiment.

The group determining device 140 includes a detecting module 142, a storage device 143, a determining module 144, and an evaluation module 146. The detecting module 142 dynamically creates an associated group set RGS, that is group set, according to the location and activation time of each load (LO1-LON), and creates the loads which have been activated and located in the same predetermined space (SP1-SP4) as an activation set OG. The detecting module 142 stores the associated group set RGS in the storage device 143, wherein the associated group set RGS includes a plurality of associated sub-groups RG1-RGN, that is sub-groups. In the associated group set RGS, the activated one(s) (also called the activated loads hereinafter) of the loads LO1-LON may belong to at least one of the associated sub-groups RG1-RGN, and the associated sub-groups RG1-RGN can be dynamically updated by the result detecting of the detecting module 142 and the evaluation module 146. For example, FIG. 3 is a schematic diagram illustrating a plurality of associated sub-groups according to an exemplary embodiment, wherein the associated group set RGS includes the associated sub-groups RG1-RG4. The associated sub-group RG1 is created by the activated loads LO1-LO3 and LO5, and the associated sub-group RG2 is created by the activated loads LO2 and LO3, the associated sub-group RG3 is created by the activated loads LO4 and LO5, and the associated sub-group RG4 is created by the activated load LO6. Furthermore, the activated loads LO2 and LO3 can be included in the associated sub-groups RG1 and RG2 at the same time, and the activated load LO5 can be also included in the associated sub-groups RG1 and RG3 simultaneously. It should be noted that the associated sub-groups RG1-RGN of the exemplary embodiments are created by the detecting module 142 according to different user behaviors.

Figure 4:
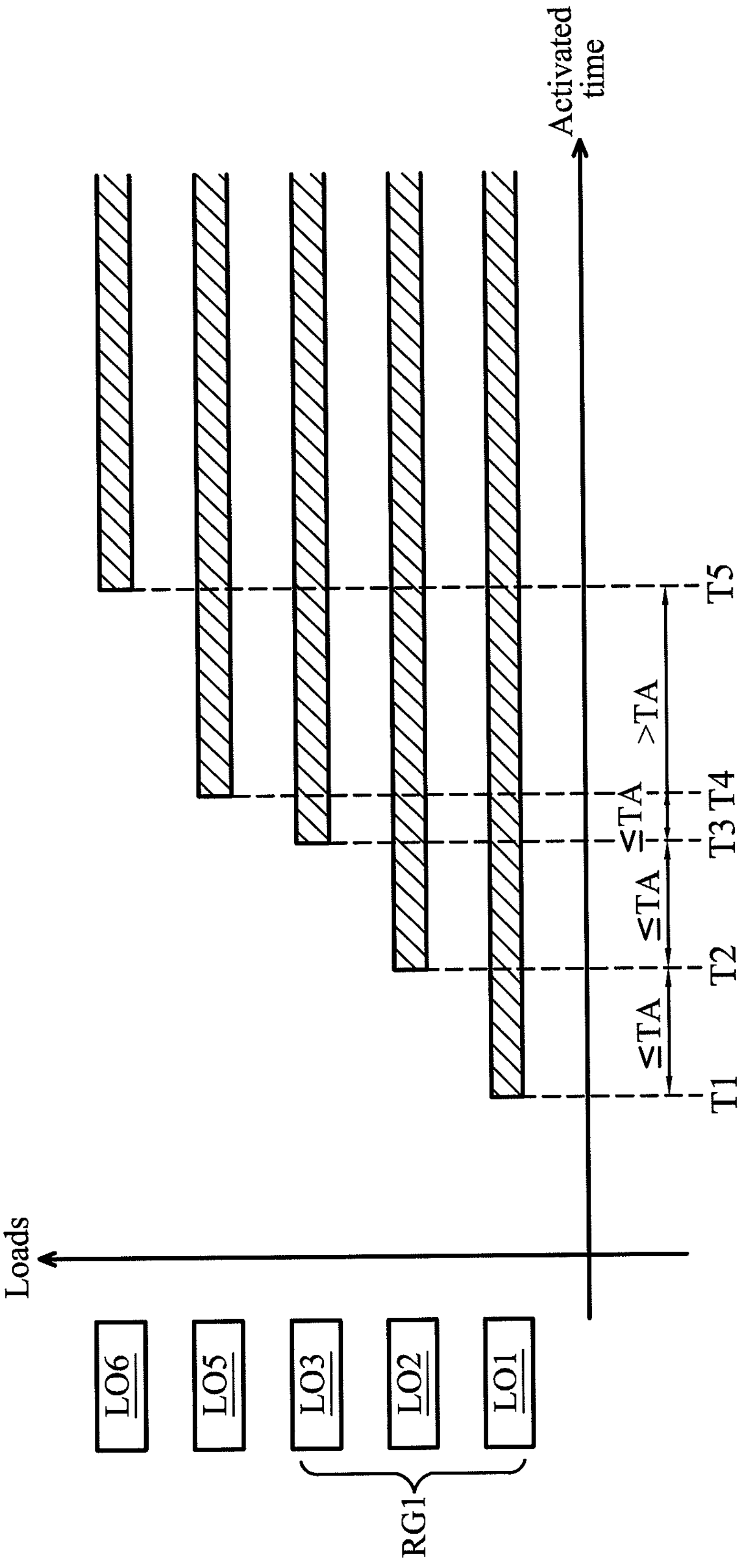
FIG. 4 is a schematic diagram illustrating activation times of a plurality of loads according to an exemplary embodiment.

As shown in FIG. 2 and FIG. 4, the loads LO1-LO6 are disposed/located in the predetermined space SP1. The detecting module 142 creates the activated loads LO1-LO3 as the associated sub-group RG1, because the duration between the activation times of each two sequentially activated ones of the plurality of loads LO1-LO3 is less than a predetermined time period interval. For example, the loads LO1-LO3 and LO5-LO6 have been activated at times T1-T5 respectively, wherein the difference of the times T1 and T2 (that is, the duration between the activation times of the loads LO1 and LO2), the difference of the times T2 and T3 (that is, the duration between the activation times of the loads LO2 and LO3), and the difference of the times T3 and T4 (that is, the duration between the activation times of the loads LO3 and LO5) are less than the predetermined time period TA. The detecting module 142 creates the loads LO1 and LO2 as the associated sub-group RG1, because the time interval between the activation times of loads LO1 and LO2 located in the same predetermined space SP1 (that is the difference of the times T1 and T2) is less than the predetermined time period TA ($T2-T1<TA$). Moreover, the detecting module 142 also assigns the load LO3 to the associated sub-group RG1, because load LO2 is the last one to be activated in the associated sub-group RG1, and the time interval between the activation times of the loads LO2 and LO3 located in the same predetermined space SP1 is less than the predetermined time period TA. Similarly, the detecting module 142 also assigns the load LO5 to the associated sub-group RG1, because the load LO3 is the last one to be activated in the associated sub-group RG1, and the time interval between the activation times of the load LO5 and load LO3 located in the same predetermined space SP1 is less than the predetermined time period TA. On the other hand, the detecting module 142 does not assign the load LO6 to the associated sub-group RG1, because the load LO5 is the last one to be activated in the associated sub-group RG1, and the time interval between the activation times of the load LO6 and load LO5 is more than the predetermined time period TA. Namely, the detecting module 142 does not assign the load LO6 to the associated sub-group RG1, because the difference of times T4 and T5 is more than the predetermined time period TA. It should be noted that FIGS. 2-4 show one embodiment of the exemplary embodiments, but it is not limited thereto.

In some embodiments, according to the locations and the activation times of the loads LO1-LON, the detecting module 142 creates an associated group set RGS for the loads which have been activated in a predetermine time and located in the same predetermined space. The predetermine time period can be 10 minutes, but is not limited thereto. In some embodiments, the detecting module 142 creates the loads, which have been activated sequentially and located in the same predetermined space, as the associated group set RGS according to the locations and the activation times of the loads LO1-LON. For example, the time difference of the currently activated load and the last activated load is less than the predetermined time period TA. That is, the currently activated load and the last activated load have been activated sequentially in the predetermined time period TA. As shown in FIG. 4, the time difference between times T1 and T2, the time difference between times T2 and T3, and the time difference between times T3 and T4 are less than the predetermined time period TA, therefore the loads LO1-LO3 and LO5 have been activated sequentially. In some embodiments, according to the locations and the activation times of the loads LO1-LON, the detecting module 142 creates an associated group set RGS for the loads which are sequentially activated in a predetermine time and located in the same predetermined space.

Figure 5:
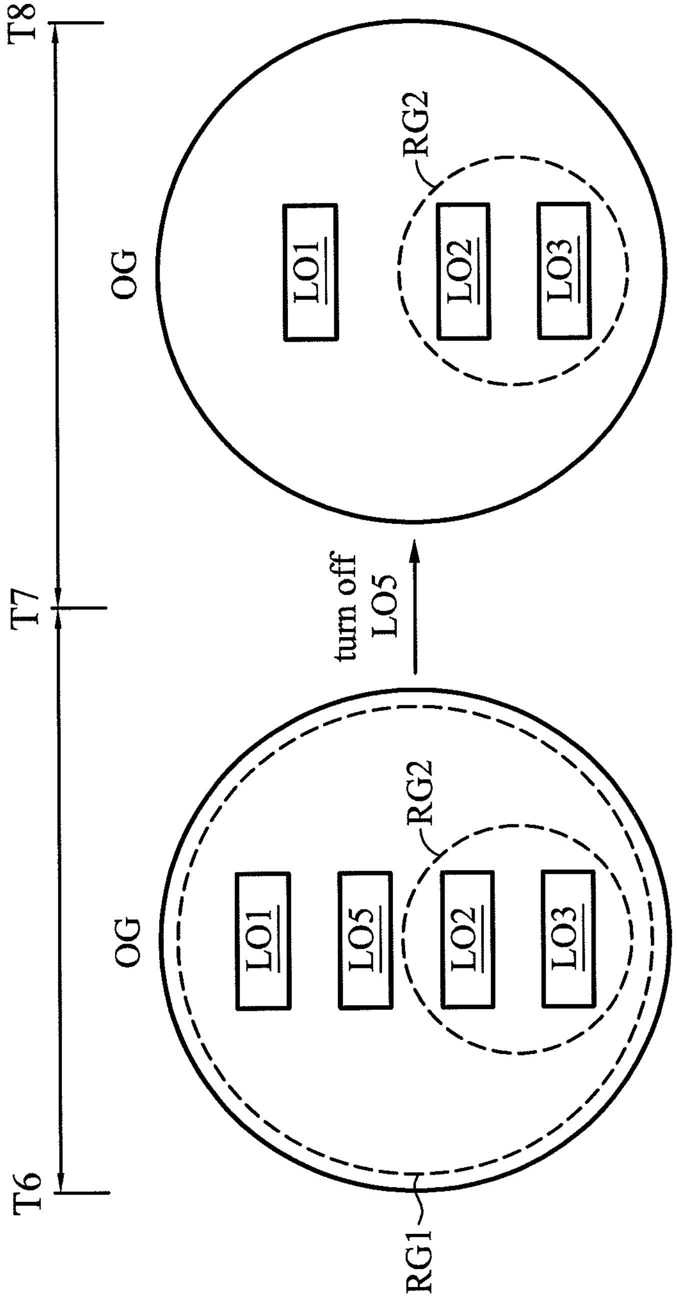
FIG. 5 is a schematic diagram illustrating an activation set according to an exemplary embodiment.

The determining module 144 determines whether each of the activated loads is an essential load or a non-essential load according to the associated group set RGS and the activation set OG, and produces a determining result S1. It should be noted that the determining result S1 is the definition of the essential or non-essential load. In a better embodiment, the determining result S1 is a set of the non-essential load(s). In the embodiment, the determining module 144 determines whether each of the activated loads is the essential load or the non-essential load according to an aggressive mode and a comfortable mode. For example, as shown in FIG. 5, during the time T6 to T7, the loads LO1-LO3 and LO5 have been activated and included in the activation set OG. In the time T7, the load LO5 is turned off by the user. After then, the detecting module 142 detects the number of the activated loads has changed, and recreates the activation set OG by the currently activated loads in the same predetermined space (such like, the loads LO1-LO3 in the predetermined space SP1). In the other word, the detecting module 142 recreates the activation set OG by the currently activated loads in the same predetermined space (such like, the loads LO1-LO3 in the predetermined space SP1) when the detecting module 142 detects the number of the activated loads has decreased. Therefore, in the time T7 to T8, the activation set OG is constructed by the loads LO1-LO3.

When the load management system 100 is in the aggressive mode, the determining module 144 compares the associated sub-groups RG1-RGN with the activation set OG respectively. When the associated sub-group is partially included in the activation set OG, the determining module 144 tags each of the loads of the associated sub-group as the non-essential load. For example, when the associated sub-group RG1 (including loads LO1-LO3 and LO5) is partially included in the activation set OG (including the loads LO1-LO3) during the time T7 to T8, the determining module 144 tags the loads LO1-LO3 and LO5 of the associated sub-group RG1 as the non-essential loads.

When the load management system 100 is in the comfortable mode, the determining module 144 compares the associated sub-groups RG1-RGN with the activation set OG sequentially. When the load(s) of the associated sub-group is completely included in the activation set OG, the determining module 144 tags the loads of the associated sub-group as the essential loads. After the comparison step, the determining module 144 tags the remaining loads which are not tagged as the essential load of the activation set OG as the non-essential loads. For example, the determining module 144 compares the associated sub-groups RG1-RGN with the activation set OG sequentially. When the associated sub-group RG2 (including the loads LO2-LO3) is included in the activation set OG (including the loads LO1-LO3) during the time T7 to T8, the determining module 144 tags each of the loads LO2-LO3 of the associated sub-group RG2 as the essential loads. After the comparison step, the determining module 144 tags the remaining load LO1 of the activation set OG, which is not tagged as the essential load, as the non-essential load.

The control device 160 automatically turns off the non-essential loads according to the determining result S1. It should be noted that the determining result S1 is the definition of the essential or non-essential load. In a better embodiment, the determining result Si is a set of the non-essential load(s). In the other embodiment, the control device 160 displays the non-essential loads of the determining result S1 for the user, and turns off the non-essential loads according to an input signal which is corresponding to the determining result S1 entered by users. Furthermore, the control device 160 includes a user interface 162 to display the determining result S1 and/or receive the input signal entered by users. In the other embodiment, the user can adjust the associated group set RGS and the aging times of the associated sub-groups RG1-RGN by the input signal. It should be noted that when the control device 160 automatically turns off the non-essential loads according to the determining result S1, the determining module 144 does not start its process even if the number of the activated loads has changed (decreased).

The evaluation module 146 determines the aging time of the associated sub-groups RG1-RGN corresponding to the non-essential loads, according to the status of the non-essential loads, wherein the status represents whether each of the loads is activated or inactivated. It should be noted that, in the exemplary embodiments, the evaluation module 146 gives each of the associated sub-groups (such like RG1-RG4) created by the detecting module 142 a predetermined aging time. For example, the aging times of the different associated sub-groups RG1-RGN can be the same, or the evaluation module 146 can give the different associated sub-groups RG1-RGN different aging times according to the user setup.

In another embodiment, the evaluation module 146 determines whether the non-essential loads have been re-activated, after a predetermined time period after the control device 160 turned off the non-essential loads automatically or according to the input signal. For example, when one of the turned-off non-essential loads is re-activated, the evaluation module 146 decreases the aging time of the associated sub-groups RG1-RGN corresponding to the load. When the turned-off non-essential loads are not turned on again (re-activated) or the non-essential loads have maintained to be in an inactivation state, the evaluation module 146 increases the aging time of the associated sub-groups RG1-RGN corresponding to the load.

In another embodiment, the detecting module 142 further deletes one of the associated sub-groups RG1-RGN (such like, associated sub-group RG1) when the all loads of the associated sub-group (such like, associated sub-group RG1) have not been simultaneously operated within the aging time. For example, the detecting module 142 deletes one of the associated sub-groups RG1-RGN (such like, associated sub-group RG1) when the loads of the associated sub-group RG1 are not working (i.e., operated) simultaneously over the aging time corresponding to the associated sub-group RG1.

It should be noted that, in the other embodiments, the load management system 100 can further include a sensing devise (not shown), such like a light sensing device or a temperature sensing device, etc. The sensing device enables the control device 160 to adjust the power of the loads LO1-LON according to the light and temperature of the environment around the loads LO1-LON. For example, when the temperature of room is lower than a predetermined temperature and a load (e.g. an air-conditioner) is still activated (working), the sensing device may enable the control device 160 to reduce the temperature of the air-conditioner or turn off air-conditioner. For another example, when the light is higher than a predetermined brightness and a load (e.g. a lamp) is still activated (working), the sensing device may enable the control device 160 to decrease the brightness of the lamp or turn off the lamp.

Figure 6:
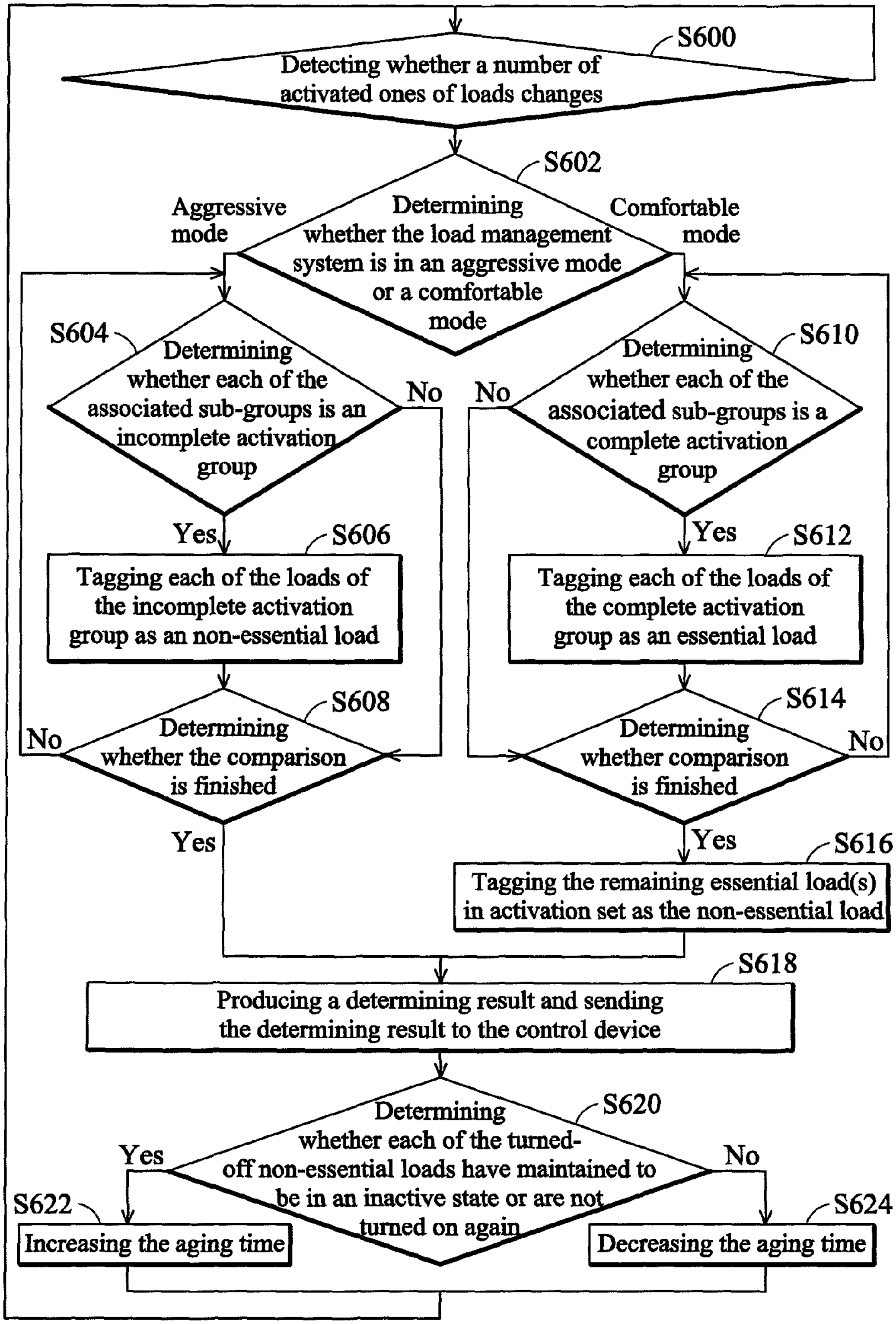
FIG. 6 is a flowchart of a load management method according to an exemplary embodiment.

FIG. 6 is a flowchart of a load management method according to an exemplary embodiment. The load management method is applied to a load management system 100. In the embodiment, the load management system 100 includes a plurality of loads LO1-LON located in at least one of the predetermined spaces (such like, SP1-SP4), and automatically creates an associated group set RGS including a plurality of associated sub-groups RG1-RGN. The process starts at the step S600, and for details, reference can be made to FIG. 3 and FIG. 5, but it is not limited thereto.

In the step S600, the load detection device 120 detects whether a number of the activated ones of the plurality of loads LO1-LON has changed. For example, when the number of the activated loads in one of the predetermined space (such like, predetermined space SP1) changes, the detecting module 142 creates the activated loads located in the predetermined space SP1 as an activation set OG. In another embodiment, the load detection device 120 detects whether a number of the activated ones of the plurality of loads LO1-LON has decreased. For example, when the number of the activated loads in one of the predetermined space (such like, predetermined space SP1) decreases, the detecting module 142 creates the activated loads located in the predetermined space SP1 as an activation set OG. For instance, as shown in FIG. 5, during the time T6 to T7, the loads LO1-LO3 and LO5 have been activated and included in the activation set OG. At the time T7, the load LO5 is turned off by the user. After then, the detecting module 142 detects the number of the activated loads has changed/decreased, and recreates the activation set OG by the activated loads LO1-LO3 in the same predetermined space. When the number of the activated loads has changed/decreased, the process goes to step S602, otherwise, the detecting module 142 continues to detect whether a number of the number of activated ones of the plurality of loads LO1-LON has changed/decreased.

In the step S602, the determining module 144 determines whether the load management system 100 is in an aggressive mode or a comfortable mode. When the load management system 100 is in the aggressive mode, the process goes to step S604; when the load management system 100 is in the comfortable mode, the process goes to step S610.

In the step S604, according to whether each of the associated sub-groups RG1-RGN is partially included in the activation set OG, the determining module 144 determines whether each of the associated sub-groups RG1-RGN is an incomplete activation group. The determining module 144 compares the activation set OG with the associated sub-groups RG1-RGN sequentially. When one of the associated sub-groups RG1-RGN is partially included in the activation set OG, the determining module 144 determines such associated sub-group as an incomplete activation group. For example, as shown in FIG. 5, the associated sub-group RG1 (including the loads LO1-LO3 and LO5) is partially included in the activation set OG (including the loads LO1-LO3) during the T7 to T8, thus, the determining module 144 determines such associated sub-group RG1 is an incomplete activation group. When the associated sub-group is an incomplete activation group, the process goes to step S606, otherwise, the process goes to step S608.

In the step S606, the determining module 144 tags each of the loads of the associated sub-group (i.e., the incomplete activation group) as a non-essential load. For example, as shown in FIG. 5, when the associated sub-group RG1 (including the loads LO1-LO3 and LO5) is partially included the activation set OG (including the loads LO1-LO3) during time 17 to T8, the determining module 144 tags each of the loads LO1-LO3 and LO5 of the associated sub-group RG1 as the non-essential load. After then, the process goes back to step S608.

In the step S608, the determining module 144 determines whether the comparison of the associated sub-groups RG1-RGN with the activation set OG is finished. When the comparison is finished, the process goes back to step S618; when the comparison is not finished, the process goes back to step S604.

In the step S610, the determining module 144 determines whether each of the associated sub-groups RG1-RGN is a complete activation group sequentially according to whether the associated sub-groups RG1-RGN are completely included in the activation set OG. The determining module 144 compares the activation set OG with the associated sub-groups RG1-RGN sequentially. When one of the associated sub-groups RG1-RGN is completely included in the activation set OG, the determining module 144 determines such associated sub-group is a complete activation group. For example, as shown in FIG. 5, the associated sub-group RG2 (including the loads LO2 and LO3) is completely included in the updated activation set OG (including the loads LO1-LO3) during the time T7 to T8, thus, the determining module 144 determines the associated sub-group RG2 is a complete activation group. When the associated sub-group is a complete activation group, the process goes back to step S612, otherwise, the process goes back to step S614.

In the step S612, determining module 144 tags each of the loads of the associated sub-group (i.e., the complete activation group) as an essential load. For example, as shown in FIG. 5, when the associated sub-group RG2 is completely included in the activation set OG during the time T7 to T8, the determining module 144 tags each of the loads LO2-LO3 of the associated sub-group RG2 as the essential load. After then, the process goes back to step S614.

In the step S614, the determining module 144 determines whether comparison of the associated sub-groups RG1-RGN with the updated activation set OG is finished. When the comparison is finished, the process goes back to step S616; when the comparison is not finished, the process goes back to step S610.

In the step S616, the determining module 144 tags the remaining load(s) in activation set OG, which is/are not tagged as the essential load(s), as the non-essential load(s). For example, as shown in FIG. 5, when the associated sub-group RG2 (including the loads LO2 and LO3) is completely included in the activation set OG (including the loads LO1-LO3) during the time T7 to T8, the determining module 144 tags each of the loads LO2-LO3 of the associated sub-group RG2 as the essential load. After the comparison step (S616), the determining module 144 tags the remaining load LO1 in the activation set OG, which is not tagged as the essential load, as the non-essential load. After then, the process goes back to step S618.

In the step S618, the determining module 144 produces a new determining result S1 according to whether each of the loads is the essential load or the non-essential load and sends the determining result S1 to the control device 160. It should be noted that the determining result S1 is the definition of the essential or non-essential load. In a better embodiment, the determining result S1 is a set of the non-essential load(s). The control device 160 automatically turns off the non-essential loads according to the determining result S1. In the other embodiment, the control device 160 displays the non-essential loads of the determining result S1 for the user, and turns off the non-essential loads according to an input signal which is corresponding to the determining result S1 entered by users. After then, the process goes back to step S620.

In the step S620, the evaluation module 146 determines whether each of the turned-off non-essential loads have maintained to be in an inactive state or have not been turned on again after a predetermined time period. After, the control device 160 turns off the non-essential loads automatically or displays the determining result S1. After passing through a predetermined time period (T), when the turned-off non-essential loads have maintained to be in the inactive state, the process goes back to step S622; when any one of the turned-off non-essential loads are turned on again or activated, the process goes back to step S624.

In the step S622, the evaluation module 146 increases the aging times of these associated sub-groups which contain at least one of the non-essential load(s) of the determining result Si but maintained to be in the inactive state. After then, the process goes back to step S600.

In the step S624, the evaluation module 146 decreases the aging time of the associated sub-groups which contain at least one of the non-essential load(s) of the determining result S1 but turned on again or activated. After then, the process goes back to step S600.

Figure 7:
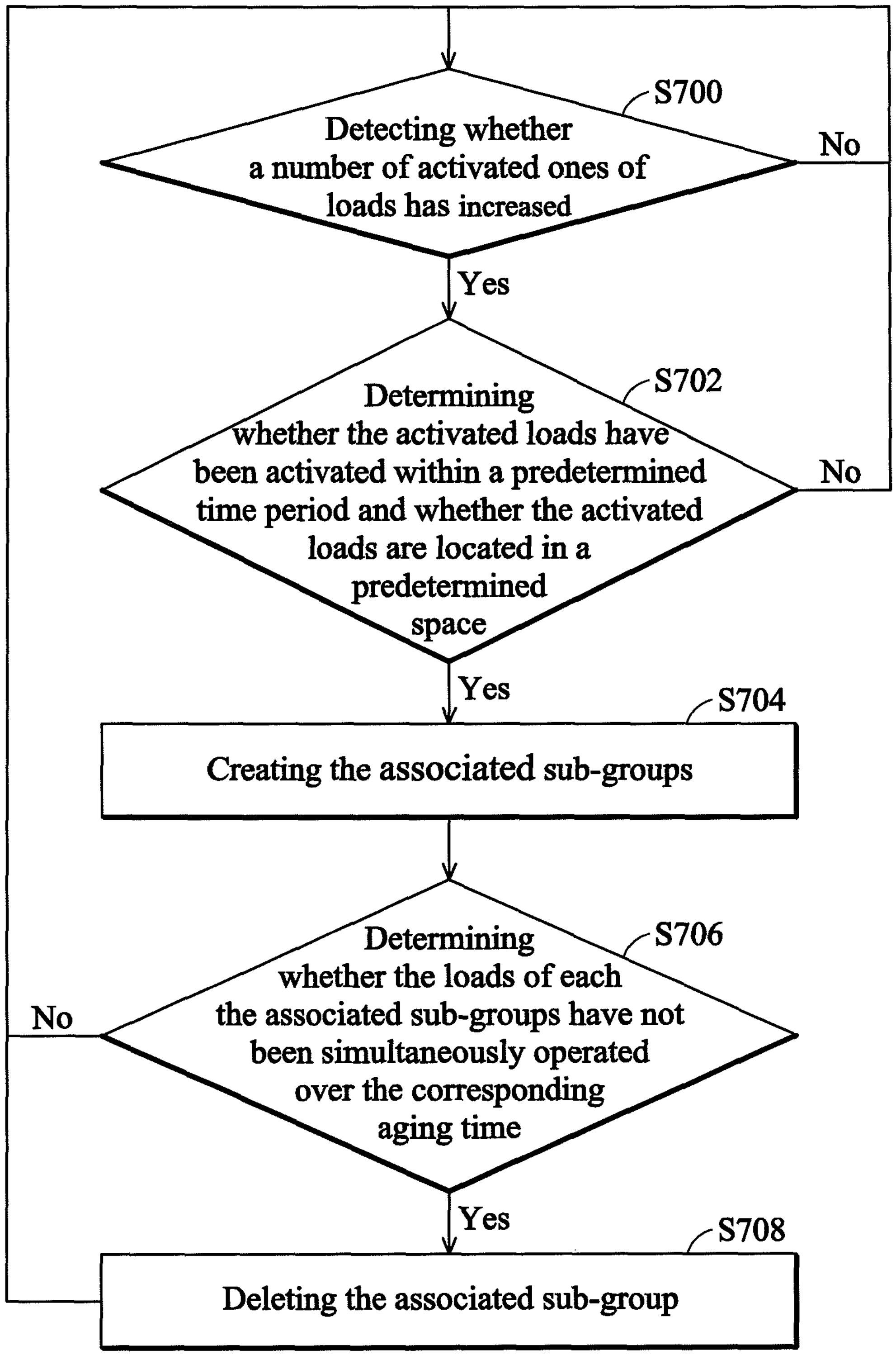
FIG. 7 is a flowchart of another load management method according to an exemplary embodiment.

FIG. 7 is a flowchart of a load management method according to an exemplary embodiment. The load management method is applied to a load management system 100. In the embodiment, the load management system 100 includes a plurality of loads LO1-LON. The process starts at the step S700.

In the step S700, load detection device 120 detects whether a number of activated ones of the plurality of loads LO1-LON has increased. When the number of the activated loads has increased, the process goes back to step S702, otherwise, the load detection device 120 continues to detect whether a number of activated ones of the plurality of loads LO1-LON has increased.

In the step S702, load detection device 120 determines whether the activated loads have been activated within a predetermined time period and whether the activated loads are located in a predetermined space. When the activated loads have been activated within a predetermined time period and are located in a predetermined space (such like, the predetermined space SP1), the process goes back to step S704, otherwise, the process goes back to step S700.

In the step S704, the load detection device 120 creates the loads located in the predetermined space SP1, which have been activated within the predetermined time period, as one of the plurality of associated sub-groups RG1-RGN. For example, shown in FIG. 2 and FIG. 4, the loads LO1-LO6 are located in the predetermined space SP1. The detecting module 142 creates the loads LO1-LO3 located in the predetermined space SP1, which have been activated within the predetermined time period, as the associated sub-group RG1. After then, the process goes back to step S706.

In the step S706, load detection device 120 determines whether the loads of each of the associated sub-groups RG1-RGN have not been simultaneously operated over the corresponding aging time. When the loads of the associated sub-group have not been simultaneously operated over the corresponding aging time, the process goes to step S708, otherwise, the process goes back to step S700.

In the step S708, load detection device 120 deletes the associated sub-group when all of the loads of the associated sub-group have not been simultaneously operated over the corresponding aging time.

Figure 8A:
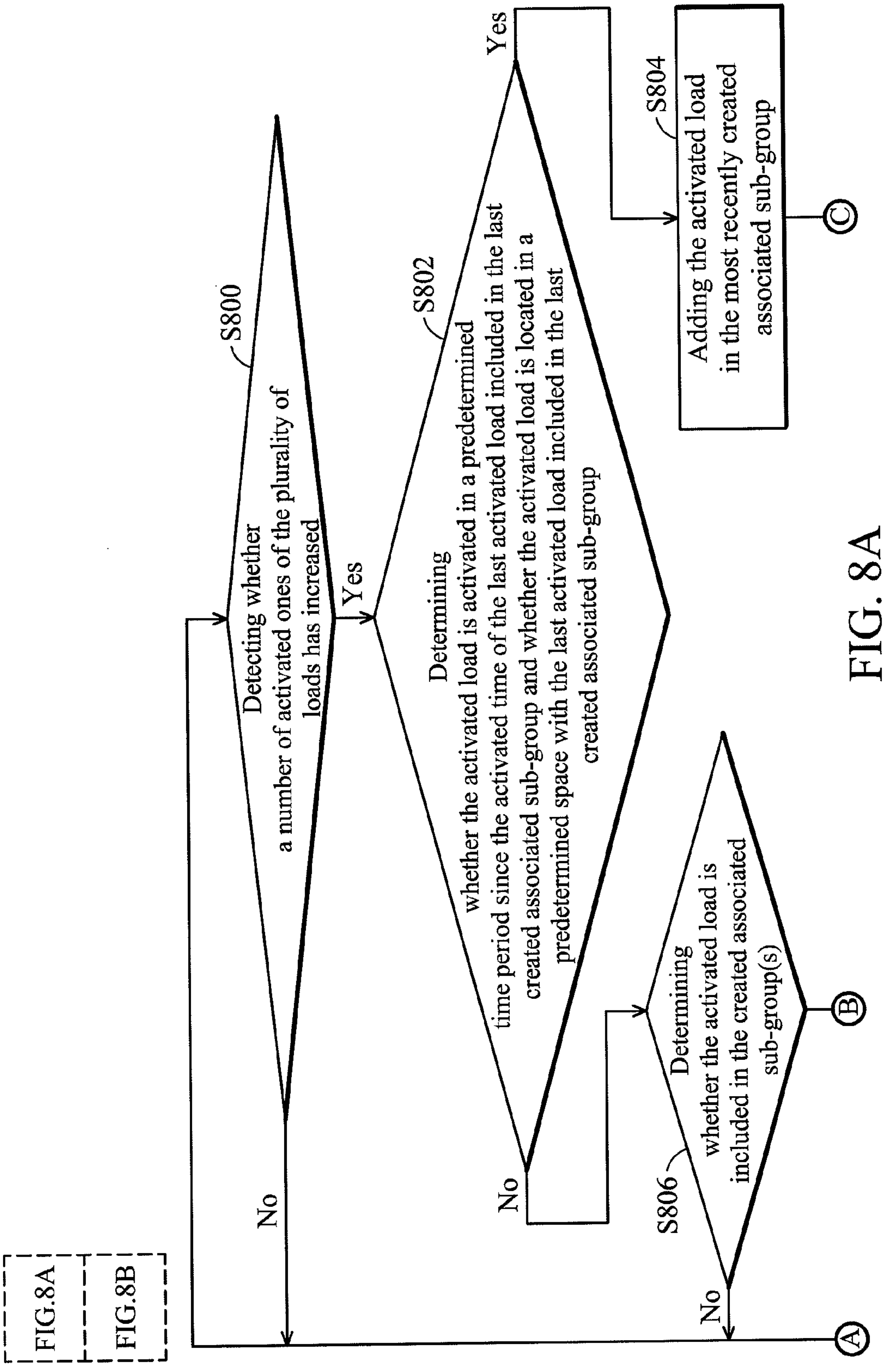
FIGS. 8A-8B are a flowchart of a load management method according to an exemplary embodiment.
Figure 8B:
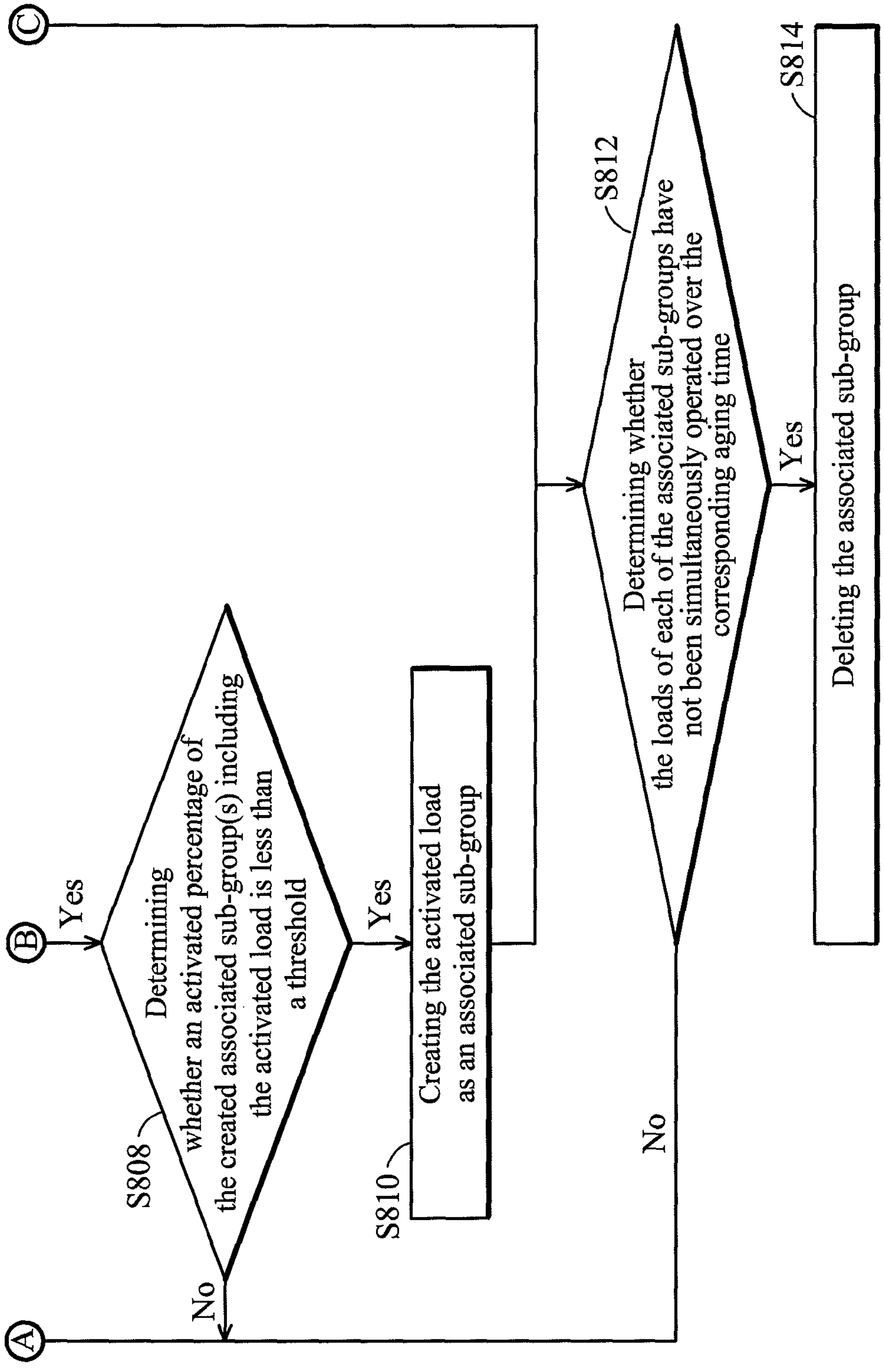

FIG. 8 is a flowchart of a load management method according to an exemplary embodiment. The load management method is applied to a load management system 100. In the embodiment, the load management system 100 includes a plurality of loads LO1-LON. The process starts at the step S800.

In the step S800, the load detection device 120 detects whether a number of activated ones of the plurality of loads LO1-LON has increased. When the number of the activated loads has increased, the process goes to step S802, otherwise, the load detection device 120 continues to detect whether a number of activated ones of the plurality of loads LO1-LON has increased.

In the step S802, the load detection device 120 determines whether the activated load is activated in a predetermined time period since the activation time of the most recently activated load (i.e., the last activated load) included in the most recently created associated sub-group (i.e., the last created associated sub-group) of the associated sub-groups and whether the activated load is located in a predetermined space with the most recently activated load included in the most recently created associated sub-group. When the activated load is activated in a predetermined time period since the activation time of the most recently activated load included in the most recently created associated sub-group and located in the predetermined space with the most recently activated load included in the most recently created associated sub-group (such like, the predetermined space SP1), the process goes to step S804, otherwise, the process goes to step S806. For example, when the activated load LO8 is activated in a predetermined time period since the activation time of the most recently activated load LO7 included in the most recently created associated sub-group RG5 (not shown in FIG. 3) and located in the predetermined space SP2 with the most recently activated load LO7 included in the most recently created associated sub-group RG5, the process goes to step S804.

In the step S804, the load detection device 120 adds the activated load in the most recently created associated sub-group. For example, the load detection device 120 adds the activated load LO8 in the most recently created associated sub-group RG5. The process goes to the step S812.

In the step S806, the load detection device 120 determines whether the activated load is included in at least one of the created associated sub-group(s). When the activated load is included in the at least one of the associated sub-group(s), the process goes to step S808, otherwise, the process goes to step S800. For example, if the activated load LO5 is activated after load LO8, because the activated load LO5 is located in the predetermined space SP1 rather than the predetermined space SP2 with the most recently activated load LO8, the process goes to step S806 from the step S802.

Then, in the step S806, because the activated load LO5 is included in associated sub-groups RG1 and RG3 shown in FIG. 3, the process goes to step S808.

In the step S808, the load detection device 120 determines whether an activated percentage of the at least one of the associated sub-group(s) is less than a threshold, wherein the activated percentage is the percentage of the number of the activated loads in the associated sub-group. When the activated percentage of the at least one of the created associated sub-group(s) is less than a threshold, the process goes to step S810, otherwise, the process goes to step S800. For example, the associated sub-group RG1 includes four loads (i.e., LO1, LO2, LO3, and LO5) and the associated sub-group RG3 includes the loads LO4 and LO5. It is assumed that the threshold is 70% and the loads LO2 and LO3 have been activated when the load LO5 is activated. After the load LO5 is activated, because loads LO2, LO3, and LO5 in the associated sub-group RG1 are activated, the activated percentage of the associated sub-group RG1 is 75%, and because only the load LO5 in the associated sub-group RG3 is activated, the activated percentage of the associated sub-group RG3 is 50%. Thus, the activated percentage (75%) of the associated sub-group RG1 is higher than the threshold (70%) and the activated percentage (50%) of the associated sub-group RG3 is lower than the threshold (70%). However, the activated percentage of the at least one of the created associated sub-group(s) are not all less than the threshold, the process goes to the step S800. In the other hand, if the threshold is 80% in the above embodiment, because the activated percentage (75%) of the associated sub-group RG1 and the activated percentage (50%) of the associated sub-group RG3 are all lower than the threshold (80%), and thus, the process goes to the step S810.

In the step S810, the load detection device 120 creates the activated load as an associated sub-group. The process goes to the step S812.

In the step S812, the load detection device 120 determines whether the loads of each of the associated sub-groups RG1-RGN have not been simultaneously operated over the corresponding aging time. When the loads of the associated sub-group have not been simultaneously operated over the corresponding aging time, the process goes back to step S814, otherwise, the process goes back to step S800.

In the step S814, the load detection device 120 deletes the associated sub-group when all of the loads of the associated sub-group have not been simultaneously operated over the corresponding aging time. The process ends at the step S814.

The load management system 100 and the load management method provided by the exemplary embodiments can automatically update and create an associated group set RGS to automatically turn off the power of the household appliances without users, and achieve the effect of power saving. The exemplary embodiments further provide the method to dynamically adjust the associated group set RGS according to the user feedback corresponding to the creation of the associated sub-groups RG1-RGN and the result of the load determination. Moreover, the exemplary embodiment detect whether the non-essential loads have maintained to be in the inactivated state after a predetermined time period to determine the user feedback corresponding to the creation of the associated sub-groups RG1-RGN and the result of the load determination.

Data transmission methods, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the exemplary embodiments have been described by way of example and in terms of the preferred embodiments, it is to be understood that the exemplary embodiments are not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A load management system, comprising:

a detecting module configured to create at least one activated one of a plurality of loads located in a predetermined space as an activation set, and create a group set comprising a plurality of sub-groups according to locations and activation times of the at least one activated one of the plurality of loads, wherein the detecting module creates the at least one activated one of the plurality of loads which has been activated within a predetermined time period as one of the sub-groups, and a determining module configured to determine whether each of the at least one activated one of the plurality of load is an essential load or a non-essential load according to the group set and the activation set, and to produce a determining result, wherein the determining module is configured to determine whether each of the at least one activated one of the plurality of loads is the essential load or the non-essential load according to an aggressive mode and a comfortable mode, wherein:

when the load management system is in the aggressive mode, the determining module is configured to compare the sub-groups with the activation set sequentially, and tag each of the loads of a first sub-group of the sub-groups as the non-essential load when the first sub-group is partially included in the activation set; and when the load management system is in the comfortable mode, the determining module is configured to compare the sub-groups with the activation set sequentially, tag each of the loads of a second sub-group of the sub-groups as the essential load when the second sub-group is included in the activation set, and tag each of the remaining loads, which is not tagged as the essential load, of the activation set as the non-essential load after the comparison.

2. The load management system as claimed in claim 1, wherein the detecting module is further configured to delete a first sub-group of the sub-groups when all of the loads of the first sub-group are not operated simultaneously over an aging time of the first sub-group.

3. The load management system as claimed in claim 1, further comprising a load detection device configured to detect and to send the locations and status of the loads to the detecting module.

4. The load management system as claimed in claim 1, further comprising a control device configured to turn off each of the non-essential loads according to the determining result.

5. The load management system as claimed in claim 4, further comprising an evaluation module configured to detect whether the non-essential loads are re-activated after a predetermined time period since the control device has turned off the non-essential loads, wherein the evaluation module is configured to decrease an aging time of the sub-group corresponding to the turned-off non-essential loads, when any of the turned-off non-essential loads is re-activated after the predetermined time period, and the evaluation module is configured to increase the aging time when the turned-off non-essential loads have maintained to be in an inactivation state after the predetermined time period.

6. The load management system as claimed in claim 4, wherein the control device is configured to display the determining result and turns off the non-essential loads according to an input signal corresponding to the determining result.

7. The load management system as claimed in claim 6, further comprising an evaluation module is configured to detect whether the non-essential loads have been re-activated after a predetermined time period after the determining result has been displayed, wherein the evaluation module is configured to decrease an aging time of the sub-group corresponding to the non-essential loads when any of the non-essential loads has been activated, and increase the aging time when the non-essential loads are inactivated.

8. A load management method, applied to a load management system, wherein the load management system comprises a plurality of loads and a group set including a plurality of sub-groups, the method comprising:

detecting whether a number of the activated ones of the plurality of the loads has changed;

creating the activated ones of the plurality of loads located in a predetermined space as an activation set when the number of the activated ones of the plurality of loads in the predetermined space has changed;

determining whether the load management system is in an aggressive mode or a comfortable mode;

determining whether each of the sub-groups is an incomplete activation group sequentially according to whether the sub-group is partially included in the activation set, when the load management system is in the aggressive mode, wherein the sub-group is the incomplete activation group when the sub-group is partially included in the activation set;

tagging each of the loads in a first sub-group of the sub-groups as a non-essential load, when the first sub-group is the incomplete activation group;

producing a determining result according to the non-essential loads; and sending the determining result to a control device to turn off the non-essential loads, wherein the aggressive mode and the comfortable mode are for the load management system to define the non-essential loads in different rules.

9. The load management method as claimed in claim 8, further comprising:

determining whether each of the sub-groups is a complete activation group sequentially according to whether each of the sub-groups is included in the activation set, when the load management system is in the comfortable mode;

tagging each of the loads of a second sub-group of the sub-groups as an essential load, when the second sub-group is the complete activation group; and tagging each of the remaining loads which is not tagged as the essential load of the activation set as the non-essential load after determining whether each of the sub-groups is the complete activation group.

10. The load management method as claimed in claim 8, wherein the non-essential loads are automatically turned off by the control device according to the determining result.

11. The load management method as claimed in claim 10, further comprising:

determining whether any of the non-essential loads has been re-activated after a predetermined time period after the non-essential loads are automatically turned off;

increasing an aging time of the sub-group corresponding to the turned-off non-essential loads, when the turned-off non-essential load have maintained to be in an inactivation state; and decreasing the aging time of the sub-group corresponding to the turned-off non-essential loads, when any of the turned-off non-essential loads is activated again.

12. The load management method as claimed in claim 8, further comprising displaying the determining result by the control device, wherein the non-essential loads are turned off by the control device according to an input signal corresponding to the determining result.

13. The load management method as claimed in claim 12, further comprising:

determining whether any of the non-essential loads has been re-activated after a predetermined time period after the determining result has been displayed;

increasing an aging time of the sub-group corresponding to the non-essential loads, when the non-essential loads have maintained to be in an inactivation state; and decreasing the aging time of the sub-group corresponding to the non-essential loads, when any of the non-essential loads has been activated again.

14. A load management method, applied to a load management system, wherein the load management system comprises a plurality of loads and an group set including a plurality of sub-groups, the method comprising:

detecting whether a number of the activated ones of the plurality of the loads has increased;

determining whether the activated load is activated in a predetermined time period since an activation time of a most recently activated load included in a most recently created sub-group of the sub-groups and whether the activated load is located in a predetermined space with the most recently activated load included in the most recently created sub-group; and adding the activated load in the most recently created sub-group when the activated load is activated in the predetermined time period since the activation time of the most recently activated load and located in the predetermined space.

15. The load management method as claimed in claim 14, further comprising:

determining whether the activated load is included in at least one of the sub-group(s) when the activated load is not activated in the predetermined time period since the activation time of the most recently activated load and/or located in the predetermined space;

determining whether an activated percentage of the at least one of the sub-group(s) is less than a threshold when the activated load is included in the at least one of the sub-group(s); and creating the activated load as an new sub-group when the activated percentage of the at least one of the sub-group(s) is less than the threshold.

16. The load management method as claimed in claim 14, further comprising deleting the sub-group when all of the activated ones of the plurality of loads of the sub-group have not been simultaneously operated over an aging time.

* * * * *